United States Patent
Lundberg

(10) Patent No.: US 8,870,173 B2
(45) Date of Patent: Oct. 28, 2014

(54) SOFTWOOD CUTTING BOARD

(76) Inventor: Melvin Robert Lundberg, Knoxville, TN (US)

(*) Notice: Subject to any disclaimer, the term of this patent is extended or adjusted under 35 U.S.C. 154(b) by 377 days.

(21) Appl. No.: 13/305,989

(22) Filed: Nov. 29, 2011

(65) Prior Publication Data

US 2013/0134644 A1    May 30, 2013

(51) Int. Cl.
*B23Q 3/00* (2006.01)
(52) U.S. Cl.
USPC .................................. 269/289 R; 269/302.1
(58) Field of Classification Search
USPC .......................................... 269/289 R, 302.1
See application file for complete search history.

(56) References Cited

U.S. PATENT DOCUMENTS

| 3,837,634 | A  | * | 9/1974 | Cobb ........................ 269/289 R |
| 6,564,685 | B1 | * | 5/2003 | Beaton ............................ 83/609 |
| 6,722,644 | B1 | * | 4/2004 | Prosser .................... 269/289 R |
| 6,991,397 | B2 | * | 1/2006 | Welch .......................... 403/297 |
| 2005/0100399 | A1 | * | 5/2005 | Welch .......................... 403/292 |
| 2013/0134644 | A1 | * | 5/2013 | Lundberg ................. 269/289 R |

* cited by examiner

*Primary Examiner* — Lee D Wilson

(57) ABSTRACT

A cutting board which is used for the preparation of types of food and/or for the presentation and cutting of appetizer type foods such as cheese, fruit, etc. The cutting board is constructed simply of a relatively thick (1½") piece of soft wood such as douglas fir and reinforced with wooden dowels perpendicular to the grain of the wood. Such unique construction maintains the flatness of the board allowing it to be maintenance free and washable in a normal dishwasher cycle without warping.

3 Claims, 1 Drawing Sheet

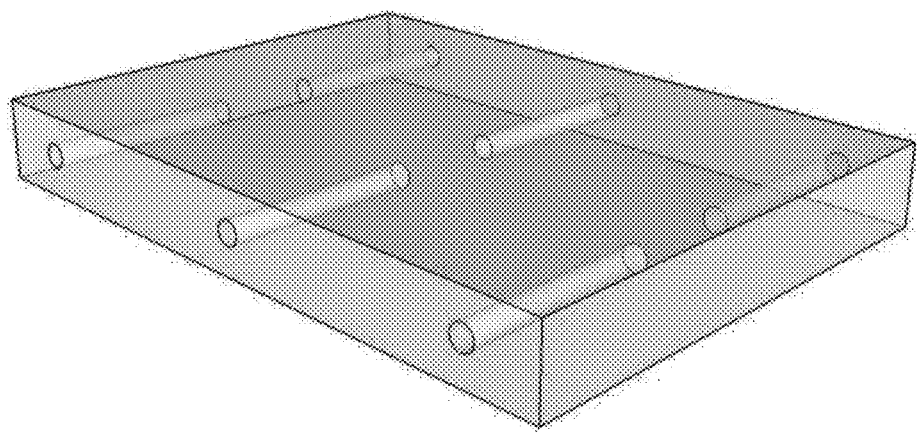

SOFTWOOD CUTTING BOARD

BACKGROUND OF THE INVENTION

1— Field of Invention

The invention relates to a food cutting board. More particularly it relates to a cutting board that is constructed of wood and can be washed and sterilized in a normal dishwasher cycle without warping. Two prototype cutting boards were constructed in 1983, used daily and subjected to hundreds of dishwashing machine cycles. They remain flat and in use today.

2— Description of Related Arts

Cutting boards are necessarily widely used for food preparation. Existing cutting boards are constructed of hard woods such as maple and walnut (frequently of laminar construction) or of plastic materials. Wooden boards are preferred by many due to their appearance and surface texture as experienced with the knife as the food is cut. These boards must be oil treated and hand washed to maintain flatness. Plastic boards offer dimensional stability when subjected to a dishwasher cycle, however the appearance and feel of the material and cutting sensation is not the same as a wooden board. In addition, the smooth surface of the plastic promotes slippage of some foods on the board and slipping of the board on the counter surface.

SUMMARY OF INVENTION

The invention is the unique construction of a softwood cutting board that allows the board to be cleaned and sterilized in a dishwashing cycle on a daily basis without warping. Proven by extended time prototype usage.

Attached drawing shows the board and illustrates its construction in an isometric view.

The cutting board is constructed of softwood, such as douglas fir with wooden dowels inserted at the centerline of the thickness (1½" thick) extending partially though the width of the board. Although not shown in the conceptual drawing the edges of the board are rounded to approximately ¼" radius. The board is to be constructed in multiple sizes to suit each purpose but to minimize weight and storage requirement space. Standard sizes 1½ inches thick include, but are not limited to:

7¼" wide×10⅛" long (mini)
9¼" wide×13" long (standard)
11¼" wide×15⅞" long (super size)

BRIEF DESCRICTION OF DRAWINGS

There is only one drawing in the application which shows the cutting board's, upper, bottom and intermediate portions with dowels.

DETAILED DESCRIPTION OF THE INVENTION

1—The primary object of the invention is to provide an aesthetically pleasing wooden board with a superior cutting surface that can be cleaned and sterilized in a normal dishwashing cycle without warping.

2—Another object is that due to the construction material, the board is relatively light weight as compared to hard wood boards or plastic boards of equivalent thickness.

3—Another object is that the soft wood surface resists slipping will not dull the knife to the extent that a hard wood or plastic surface does.

4—Another object is that the utilization of shorter dowels promotes the flatness of the board as opposed to solid wooden board or dowels continuous for the width of the board.

What is claimed is:

1. A cutting board for cutting food said cutting board comprising:
    A board including an upper surface, bottom surface,
    and an intermediate portion in between said upper and bottom surfaces;
    and a plurality of dowels with a cylindrical shapes being planar and parallel spaced within said intermediate portion
    with said dowels forming parallel rows and columns wherein said dowel prevent warping from washing said board in dish washer.

2. The cutting board according to claim 1 wherein said board is made out wood.

3. The cutting board according to claim 1 wherein said board is made out soft wood.

* * * * *